Aug. 14, 1923.
P. SCHAWANG
TEAT CUP
Filed Jan. 30, 1922
1,465,002
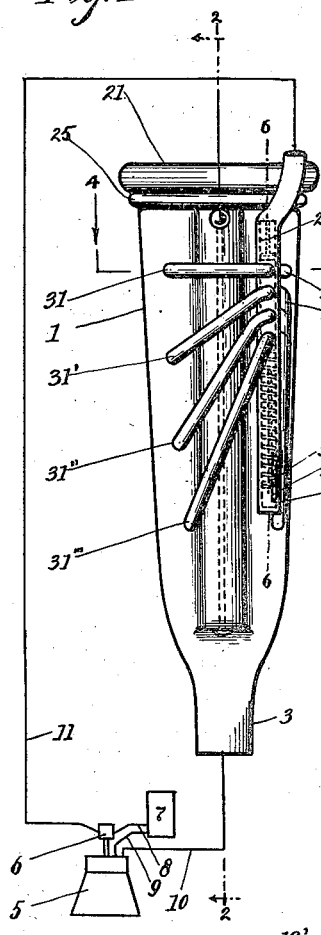
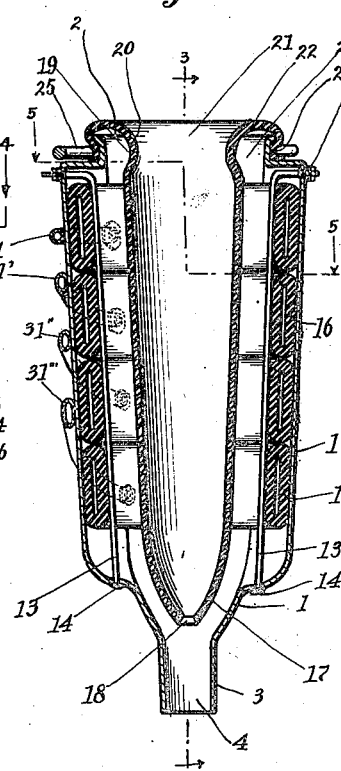
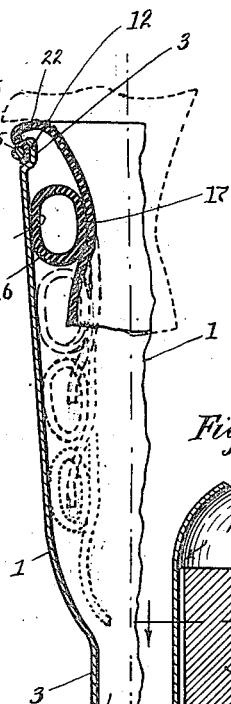
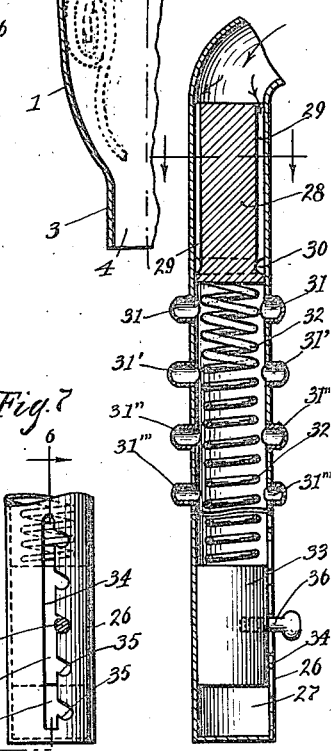
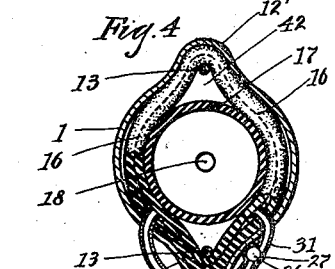
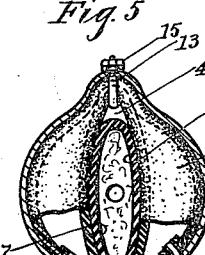
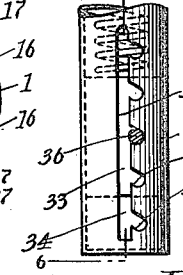
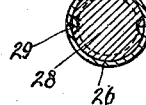
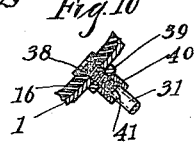
Inventor,
Peter Schawang
by H. S. Johnson
his Attorney.

Patented Aug. 14, 1923.

1,465,002

UNITED STATES PATENT OFFICE.

PETER SCHAWANG, OF ST. PAUL, MINNESOTA.

TEAT CUP.

Application filed January 30, 1922. Serial No. 532,539.

*To all whom it may concern:*

Be it known that I, PETER SCHAWANG, a citizen of the United States, residing at St. Paul, in the county of Ramsey and State of Minnesota, have invented certain new and useful Improvements in Teat Cups, of which the following is a specification.

My invention relates to teat cups for use in connection with that type of mechanical milking machines, wherein a pulsator is employed for the purpose of communicating alternate pressure and vacuum to milking devices whereby to actuate them. More particularly, my invention relates to teat cups, and contemplates the provision of means, whereby the application of pressure to the teat will be applied in regular succession, from above downwards, at a plurality of predetermined points, separated longitudinally of the teat, whereby the stripping of the teat is accomplished without injury or physical discomfort to the cow.

Ordinary teat cups, wherein a plain rubber milking tube, or teat cup proper, is relied upon, to communicate pressure to the teat, as by alternating pressure and vacuum impulses, the collapsing action of the tube involves either a compression of the rubber circumferentially, or wrinkling the wall of the tube to effect a reduction of its diameter in rapid succession. As the rubber will not, at all times, compress evenly, wrinkles will form and thereby pinch the teat and give rise to inflammation.

A further object of my invention is to provide improved means in a pressure actuated teat cup, whereby wrinkling of the teat envelope is eliminated, and a simultaneous elongation and progressive compression is effected.

With these and other objects to be pointed out, as this specification progresses, the invention consists in the construction, combination and arrangement of parts hereinafter described and claimed.

In the accompanying drawings:

Figure 1, is a side elevation of a teat cup embodying my invention, it being shown, diagrammatically, in connection with a pulsator and a milk receptacle.

Fig. 2, is a sectional view on line 2—2 of Fig. 1.

Fig. 3, is a vertical sectional view on line 3—3 of Fig. 2, showing the progressive stages of inflation of the pressure pads.

Fig. 4, is a sectional view on line 4—4 of Fig. 1.

Fig. 5, is a sectional view on line 5—5 of Fig. 2.

Fig. 6, is an enlarged vertical sectional view on line 6—6 of Fig. 1.

Fig. 7, is a side view of the lower portion of Fig. 6, showing the spring adjustment means.

Fig. 8, is a sectional view on line 8—8 of Fig. 6.

Fig. 9, is a perspective view of the clamping ring for holding the teat, and

Fig. 10, is a modified form of the tube connection with the pressure pads.

The invention comprises an outer casing or shell 1, formed, as here shown, with a circular relatively large top opening 2, and a tubular lower extremity 3, forming a relatively small discharge opening 4, which latter is connected to the milk receiving receptacle 5. The milk receptacle may be of any conventional type, and here forms part of a diagram, wherein 6 designates a pulsator, said pulsator communicating with the vacuum reservoir 7, by means of the conduit 8, said reservoir communicating, by means of conduit 9 with the milk receptacle, as does also the discharge opening 4 of the casing, by means of the conduit 10. The conduit 11 in communication with the pulsator, leads to the top of the casing, where it communicates with parts hereinafter described. By means of the pulsator, which may be of any conventional type, atmospheric pressure and vacuum are alternately communicated to the conduit 11. Thus, the discharge 4 communicates with the vacuum reservoir as by the elements 10, 5 and 9.

The casing is further formed, exteriorly, adjacent the opening 2, with an annular groove 12, the body of the casing being preferably tapered toward the discharge end. The casing is, generally, circular in cross section, opposite sides thereof being bulged outwardly at 12′ to form longitudinal arcuate bottomed channels or areas which merge with the interior of the casing. Extending longitudinally parallel with the bottoms of said channels and located preferably wholly in the area thereof, one for each side of the casing, are the supporting rods 13, the latter extending from the extreme tops of the channels, to a point adjacent the tubular end 3. The rods extend at their lower extremities through the wall of the casing, and are formed with suitable heads 14 thereat, to form an air tight joint, the upper ends of the rods being bent laterally and extending through the sides of the casing and having nuts 15 threaded thereon, whereby, when said nuts are removed, the rods may be withdrawn from the casing through the openings closed by the heads 14.

Arranged, one above the other in superposed relation, within the casing, are the pneumatic collapsible pressure pads 16, made preferably of soft rubber, and in the form of endless tubes. The tubes are preferably made to normally assume a flattened contour, as shown in Fig. 2, and lie flatly against the encircling inner wall of the casing, and extend around the rods 13. This position is best illustrated in Fig. 4, wherein the tube is partly broken away to show the interior thereof.

Extending concentrically into the interior of the casing is the teat socket or envelope 17, adapted to comfortably receive the teat. The envelope is circular and tapered and has a conoidal lower end, provided with a milk outlet opening 18, the latter located in close proximity to the discharge opening 4 of the casing.

At its top, the envelope is formed with a reduced neck portion 19, whereby to form an annular internal bead 20 in the mouth 21 of the envelope. The mouth is funnel-shaped, the curved outwardly flared collapsible wall 22, being formed with a peripheral return curve at its outer edge, which latter terminates with an annular groove 23, said groove portion of the mouth 21, adapted to seat under stress of the rubber, in the groove 12. To prevent dislodgment of the elastic teat receptacle or envelope, a retaining clamp 25 may be provided, which latter is adapted to be sprung under tension of its spring into the groove 23, so that a downward pulling action on the teat receptacle will be effectively resisted. The bead 20 in the mouth of the receptacle tends to prevent the latter from slipping off the teat, while the soft annular cushion constituted in the hollow well rounded upper end of the receptacle avoids injury to the udder. In Figure 4, the teat receptacle is shown in its normal circular state, the latter being preferably constructed so that the resistance against collapse will be sufficient to hold the pressure pads in close conformity to the inner wall of the casing. (Fig. 4.)

Suitably secured to the outside of the casing, preferably longitudinally adjacent one of the ridges 12', formed by the internal channels, is the valve manifold 26, the latter comprising a tubular housing 27, wherein is slidably fitted the piston valve 28, the latter formed with opposite longitudinal ports 29, communicating with the annular port 30 surrounding the valve body. Communicating with the interior of the housing from opposite sides thereof are the conductor tubes 31, arranged in lateral alinement and in vertical rows and suitably spaced vertically, from one another, so that when the piston valve is caused to move downward past the tube inlets, the port 30 will progressively communicate with the several pairs of tubes.

To maintain the piston valve in position above the tube inlets, out of communication therewith, I provide the extensile coil spring 32, which latter rests on the plug 33. For the purpose of regulating the tension of the spring, the plug 33 is rendered vertically adjustable in the housing 27, as by means of the longitudinal slot 34, having a plurality of spaced notches forming shoulders 35 in one of its sides, said notches adapted to receive the stop pin 36 extending through the slot and secured to the side of the plug. Thus, the plug may be held at several levels to vary the tension of the spring.

The tubes 31, 31', 31" and 31'" lead laterally from opposite sides of the valve manifold to the several pressure pads, each pair of tubes having operative connection, (to alternately communicate pressure and vacuum thereto) with that pressure pad corresponding to its numerical position on the valve manifold; thus 31 is connected to the uppermost pad, 31' to the second pad, 31" to the third and 31'" to the lower pad. The tubes may be connected in any suitable manner, the connection shown, consisting of a washer or nut suitably secured to the end of the tubes, whereby the wall of the pad is held against the inner wall of the casing, the tubes being suitably fastened at 37 to the casing to render the tube connection leakproof.

Figure 10, represents a modified form of connection, 38 designating a flanged stud extending from the inside of the pad through the casing and beyond the outside of the latter, and 39 designating a flat nut threaded on the stud, whereby the pad and casing may be firmly clamped together to form a joint. The tube is secured to the stud by means of the nut, which latter is swiveled on the tube as by means of the collar 41. By this arrangement the pads may be easily detached for removal from the teat cup for the purpose of cleansing or renewal. While I have shown two tube connections for each pad, a single connection may be used.

In operation, when atmospheric pressure is admitted to the valve manifold, the piston will be moved under tension of the spring 32 to pass the tube inlets, the pressure being thereby communicated progressively to the tubes during piston travel, thereby inflating the pressure pads gradually from above downwards. In Fig. 5, a pad is shown practically fully inflated, the teat receptacle and teat being shown flattened, inasmuch as the rods 13 prevent the pads from assuming a circular contour when inflated.

The area 42, created by restricting the inflated contour of the pads, affords clearance to permit the teat and its envelope to flatten, thereby preventing wrinkling of the envelope wall, and injury to the teat.

In Figure 3, the inflation of the pads is shown to gradually reduce in extent, from above downwards. This may be accomplished by constructing the pads with walls of varying thicknesses, the top pad having the thinnest wall to offer the least resistance to inflation.

In Figure 6, the tubes are shown gradually slightly smaller in diameter, the lower being the smallest, whereby inflation as shown in Figure 3, may be accomplished. It is to be understood, however, that I am not to be limited to gradually reducing the extent of inflation of the pads.

As the several pads are inflated, the teat envelope or receptacle will be slightly elongated, as the crimp forming the rounded surface 20 in the mouth of the envelope, will tend to straighten out as shown in Figure 3. Thus, a relative elongation of the envelope is had concurrently with compression action, whereby an effective stripping movement of the teat is secured. As there is a constant vacuum in the casing the milk is drawn off and discharged into the milk receptacle 5.

I claim:

1. A teat cup comprising an outer casing having lengthwise channels, a collapsible teat-receiving member arranged within the casing, a series of annular inflatable pads encircling the member within the casing, and means for securing the pads in the channels and dividing the same into opposed pairs of inflatable sections.

2. A teat cup comprising an outer casing having lengthwise channels, a collapsible teat-receiving member arranged within the casing, a series of annular inflatable pads encircling the member within the casing, and a rod extending lengthwise in each channel between the pads and said member and adjustably secured to the casing for holding the adjacent portions of said pads from said member.

3. A teat cup, comprising an outer casing, an inner elastic compressible teat receiving member, connected to the top of said casing, and having a milk outlet at its lower extremity, a plurality of superposed elastic inflatable pads normally deflated, engaging opposite sides of said inner member and the wall of said casing, means for successively inflating said pads progressively in teat stripping direction to compress said inner member, and means in the casing to provide clearance on opposite sides of said inner member to permit lateral expansion thereof during a compression operation.

4. A teat cup comprising an outer casing having a lengthwise channel, a collapsible teat-receiving member arranged within the casing, a series of annular inflatable pads encircling the member within the casing, and means in the channel for holding the adjacent portions of said pads from said member.

5. A teat cup comprising an outer casing having an outwardly bulged portion defining a lengthwise channel, a collapsible teat-receiving member arranged within the casing, a series of annular inflatable pads encircling the member within the casing, and a valve manifold nested exteriorly at the base of the bulged portion and having connections with the several pads.

6. A teat cup comprising an outer casing, a collapsible teat-receiving member arranged within the casing, a series of annular inflatable pads encircling the member within the casing, a valve manifold having a series of ports progressively connected to the pads downwardly, the size of the ports progressively decreasing downwardly, and a controlling valve in the manifold.

7. The combination with a teat cup, conductor tubes, connecting different portions of the cup to a pulsator to alternately inflate and deflate said portions, a valve housing in communication with said tubes disposed transversely thereof, a valve normally closing the pulsator connections, said valve slidable in said housing responsive to an inflating operation for progressively opening said pulsator connections, and means for varying the responsiveness of the valve to the pulsator.

8. The combination with a teat cup, connection between different portions of the cup and a pulsator, a valve in operative connection with the connections of said different portions and slidable transversely thereof and actuated by the pulsations therein, for controlling the order of distribution of pulsations to said different portions, and adjustable resilient means opposing a sliding movement of said valve for regulating the resistance of said valve to actuating pulsations.

9. A teat cup including a valve manifold having a series of ports progressively connected to different portions of the cup in a downward direction, a pressure actuated valve in the manifold, a resisting spring bearing against the valve, and an adjustable support for said spring.

In testimony whereof I affix my signature.

PETER SCHAWANG.